United States Patent
Yamasaki et al.

(10) Patent No.: US 6,780,262 B2
(45) Date of Patent: Aug. 24, 2004

(54) MULTILAYER DISC MANUFACTURING APPARATUS, AND DISC BONDING METHOD

(75) Inventors: Takeshi Yamasaki, Kanagawa (JP); Tomomi Yukumoto, Chiba (JP); Motohisa Haga, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/203,566

(22) PCT Filed: Nov. 29, 2001

(86) PCT No.: PCT/JP01/10442
§ 371 (c)(1),
(2), (4) Date: Nov. 15, 2002

(87) PCT Pub. No.: WO02/49026
PCT Pub. Date: Jun. 20, 2002

(65) Prior Publication Data
US 2003/0141003 A1 Jul. 31, 2003

(30) Foreign Application Priority Data
Dec. 13, 2000 (JP) ........................... 2000-379153

(51) Int. Cl.⁷ .............................................. B32B 31/20
(52) U.S. Cl. ..................... 156/64; 156/152; 156/358; 156/360; 156/378
(58) Field of Search ........................... 156/64, 152, 358, 156/360, 367, 368, 378, 379

(56) References Cited

U.S. PATENT DOCUMENTS 5,080,736 A * 1/1992 Matsui ..................... 156/64
6,000,124 A * 12/1999 Saito et al. ............... 29/830

FOREIGN PATENT DOCUMENTS

| JP | 61-286739 | 12/1986 |
|---|---|---|
| JP | 3-173984 | 7/1991 |
| JP | 3-290881 | 12/1991 |
| JP | 9-326137 | 12/1997 |
| JP | 2000-67473 | 3/2000 |

OTHER PUBLICATIONS

Translation of JP 2000–067473, cited in IDS.*
International Search Report.

* cited by examiner

Primary Examiner—Richard Crispino
Assistant Examiner—George R. Koch, III
(74) Attorney, Agent, or Firm—Rader, Fishman & Grauer PLLC; Ronald P. Kananen (57) ABSTRACT

There are provided a multilayer disc manufacturing apparatus and method, capable of computing a rotational eccentricity of a disc with no contact with the disc and a high accuracy, and producing the disc with lower costs without having to rotate the disc or perform any complicated operations. The multilayer disc manufacturing apparatus (100) is for manufacturing a multilayer disc by bonding one disc (220) to another disc (210). The apparatus includes means for fixing, in place, one (220) of the discs which form together a multilayer disc, means (150) for projecting a light onto a boundary (223) between an embossed signal recording area (221) and non-signal recording area on the one disc (220) fixed in place, means (140) for capturing a return light from the boundary (223) illuminated with the light projected from the light projecting means (150), means (131) for positioning the center of a signal recording area on the other disc (210) and means (110) for varying the position of the centering means (131) in relation to the disc fixing means.

23 Claims, 11 Drawing Sheets

FIG. 14

MULTILAYER DISC MANUFACTURING APPARATUS, AND DISC BONDING METHOD

TECHNICAL FIELD

The present invention generally relates to a manufacturing apparatus and method for a multilayer disc such as an optical recording medium or the like.

BACKGROUND ART

The multilayer structure made of multiple discs is used in an optical recording medium for example, and more specifically, in the so-called DVD (digital versatile or video disc) and the like.

Such a multilayer disc is formed by bonding multiple discs together with their central holes being centered to each other.

More particularly, two discs are held by different holders, respectively, central holes in the discs are centered with each other, and then the discs are bonded with a glue to each other. The multilayer disc manufacturing apparatus has a common centering pin to center the discs at their central holes with each other. Namely, the centering pin is introduced into the central holes in the two discs to make the central holes concentric with each other for aligning the discs at the central holes thereof with each other.

When the centering pin is thus used to align the two discs at their central holes with each other, a fitting clearance will take place without fail between the inner wall of each of the central holes and the centering pin. Since the clearance varies from one radial direction of another of the centering pin in each of the discs, such a clearance error will result in an eccentricity of the rotation center of each misalignment between the rotation centers of the discs bonded to each other.

The eccentricity of the rotation center of each disc is called "rotational eccentricity". If the rotational eccentricity exceeds a given range, there will result a defective multilayer disc from which a signal detector cannot detect any recorded signal.

To avoid the above, two discs have to be bonded to each other for the rotational eccentricity to fall within a given range in which the signal detector can detect signals from the discs.

However, as the number of discs in a multilayer disc is increased, the above rotational eccentricity will be cumulated and cannot be maintained to fall within the given range. Also, in the case of a "DVR (digital video recording)" disc incorporating multiple discs one of which is formed from a sheet-shaped disc smaller in thickness than the other disc, the centering pin fitted in the central hole formed in the thin sheet-shaped disc will possibly damage the latter.

Further, the rotational eccentricity is conventionally computed based on a maximum run-out of the disc being actually rotated. Therefore, to rotate the disc for this purpose, the multilayer disc manufacturing apparatus has to include a disc rotating mechanism and rotation guide mechanism, which will add to the complexity of the apparatus, thus resulting in the size and costs of the apparatus.

Rotating the disc actually as above will increase the tact time and thus increase the manufacturing costs for the multilayer disc.

DISCLOSURE OF THE INVENTION

Accordingly, the present invention has an object to overcome the above-mentioned drawbacks of the prior art by providing a multilayer disc manufacturing apparatus and method capable of computing the rotational eccentricity of a disc with no contact with the disc and a high accuracy and producing the disc with less costs without having to rotate the disc or any complicated operations.

The above object can be attained by providing an apparatus for manufacturing a multilayer disc by bonding one disc to another disc, the apparatus including according to the present invention:

means for fixing the one disc in place;

means for projecting a light onto a boundary between an embossed signal recording area and a non-signal recording area on the one disc fixed in place;

means for capturing a return light from the boundary illuminated with the light projected from the light projecting means;

means for positioning the center of a signal recording area on the other disc; and means for varying the position of the centering means in relation to the disc fixing means.

In an embodiment of the present invention, light is projected onto the boundary between the embossed signal recording area and the non-signal recording area with the one disc being fixed by the disc fixing means. The light incident upon the boundary is reduced in intensity along the axis of the light due to a reflection at, or transmission through, the embossed signal recording area under a phenomenon of diffraction.

By capturing a return light reduced in intensity and a one not reduced in intensity by the return light capturing means, the center of the signal recording area on the one disc can be computed.

Based on the thus computed center of the signal recording area on the one disc, the relative position varying means is moved. Then, the center of the signal recording area on the one disc is made coincident with that of the signal recording area on the other disc to compute the rotational eccentricity of the one disc with no contact with the disc and a high accuracy and thus to accurately limit the rotational eccentricity of the multilayer disc to fall within a given range.

Also, the above object can be attained by providing a multilayer disc manufacturing apparatus wherein the disc fixing means is preferably a suction unit to fix the one disc by suction, the centering means is a centering pin, and the relative position varying means is a biaxial stage laid in a plane parallel with the one disc.

Also, in this construction, the disc fixing means is a suction unit to fix the one disc by suction. It can fix the one disc easily and positively. The centering means is a centering pin also capable of positioning the center of the other disc easily and positively. Further, the relative position varying means is a biaxial stage laid in a plane parallel with the one disc. By moving the stage biaxially, the one disc can be moved easily and positively.

Also, the above object can be attained by providing a multilayer disc manufacturing apparatus wherein the centering pin preferably has a taper portion whose diameter is smaller towards the free end thereof.

In the construction of another embodiment, the taper portion of the centering pin, whose diameter is smaller towards the free end thereof, permits positioning of the other disc for no fitting clearance to take place between the inner wall of the central hole, for example, and the centering pin. Thus, the rotational eccentricity of the other disc can be minimized.

Also, the above object can be attained by providing a multilayer disc manufacturing apparatus wherein multiple centering pins of different diameters are available.

In this construction the multiple centering pins of different diameters are compatible with multiple types of the other disc having central holes different in inside diameter from each other.

Also, the above object can be attained by providing a multilayer disc manufacturing apparatus wherein the light projecting means projects light generally vertically onto the surface of the one disc and the return light capturing means captures return light generally vertically reflected from the surface of the one disc.

In this construction, a difference in amount of light reflected under the phenomenon of diffraction in the signal recording area can accurately be captured even when a signal in the embossed signal recording area of the one disc is densely recorded with narrow track pitches and the one disc is a translucent low-reflection sheet, for example.

Also, the above object can be attained by providing a multilayer disc manufacturing apparatus wherein the one disc is a sheet-shaped disc while the other disc is a substrate-like disc, and the sheet-shaped disc is formed thinner than the substrate-like disc.

In this construction, the sheet-shaped disc, easily damageable, is centered not by the central hole formed therein and the centering pin, so that the sheet-shaped disc itself will not possibly be damaged at all as with the prior art.

Also, the above object can be attained by providing a method for manufacturing a multilayer disc by bonding one disc to another disc, the method including, according to the present invention, the steps of:

fixing the one disc in place by a fixing means;

projecting, by a light projecting means, a light onto a boundary between an embossed signal recording area and non-signal recording area on the one disc fixed in place;

capturing, by a return light capturing means, a return light from the boundary illuminated with the light projected from the light projecting means;

determining the center of the signal recording area on the one disc based on information as to the signal recording area, acquired in the return light capturing step;

moving means for varying the position of the means for positioning the center of the signal recording area on the other disc in relation to the disc fixing means in order to align the center of the signal recording area of the one disc, determined in the area center determining step, with the centering means; and bonding the one disc and the other disc to each other.

In the above method, the light is projected onto the embossed signal recording area on the one disc with the one disc being fixed by the disc fixing means. The incident light is reduced in intensity along the axis of the light due to a reflection at, or transmission through, the embossed signal recording area under a phenomenon of diffraction.

In the return light capturing step in which a return light reduced in intensity and a one not reduced in intensity are captured and the area center determining step, the center of the signal recording area on the one disc can be-computed.

To align the center of the signal recording area on the one disc, which was determined in the area center determining step with the centering means for positioning the center of the signal recording area on the other disc, the center of the signal recording area on the one disc is made coincident with that of the signal recording area on the other disc in the relative position varying means moving step to correct the rotational eccentricity.

In the disc bonding step, the one disc and the other disc are bonded to each other.

Thus, the rotational eccentricity of the one disc can be computed with no contact with the disc and a high accuracy, and the rotational eccentricity of the multilayer disc can be limited accurately to fall within a given range.

Also, the above object can be attained by providing a multilayer disc manufacturing method wherein the return light capturing means include multiple CCD cameras and the rotational eccentricity is computed based on the information captured by the multiple cameras in the area center determining step.

In this method the rotational eccentricity can be computed with a higher accuracy. Therefore, the rotational eccentricity can be corrected with a higher accuracy.

Also, the above object can be attained by providing a multilayer disc manufacturing method wherein the light projecting means projects light generally vertically onto the surface of the one disc and the return light capturing means captures a return light generally vertically reflected from the surface of the one disc.

Also, the above object can be attained by providing a multilayer disc manufacturing method wherein the one disc is a sheet-shaped disc while the other disc is a substrate-like disc, and the sheet-shaped disc is formed thinner than the substrate-like disc.

BEST MODE FOR CARRYING OUT THE INVENTION

Referring to the drawings, a preferred embodiment of the present invention will be explained in detail.

Note that since the best mode for carrying out the present invention, which will be described in the following, is a preferred embodiment, so various preferable limitations are applied thereto. The technical scope of the present invention is not of course limited to the best mode unless the present invention is otherwise limited.

Figure 1:
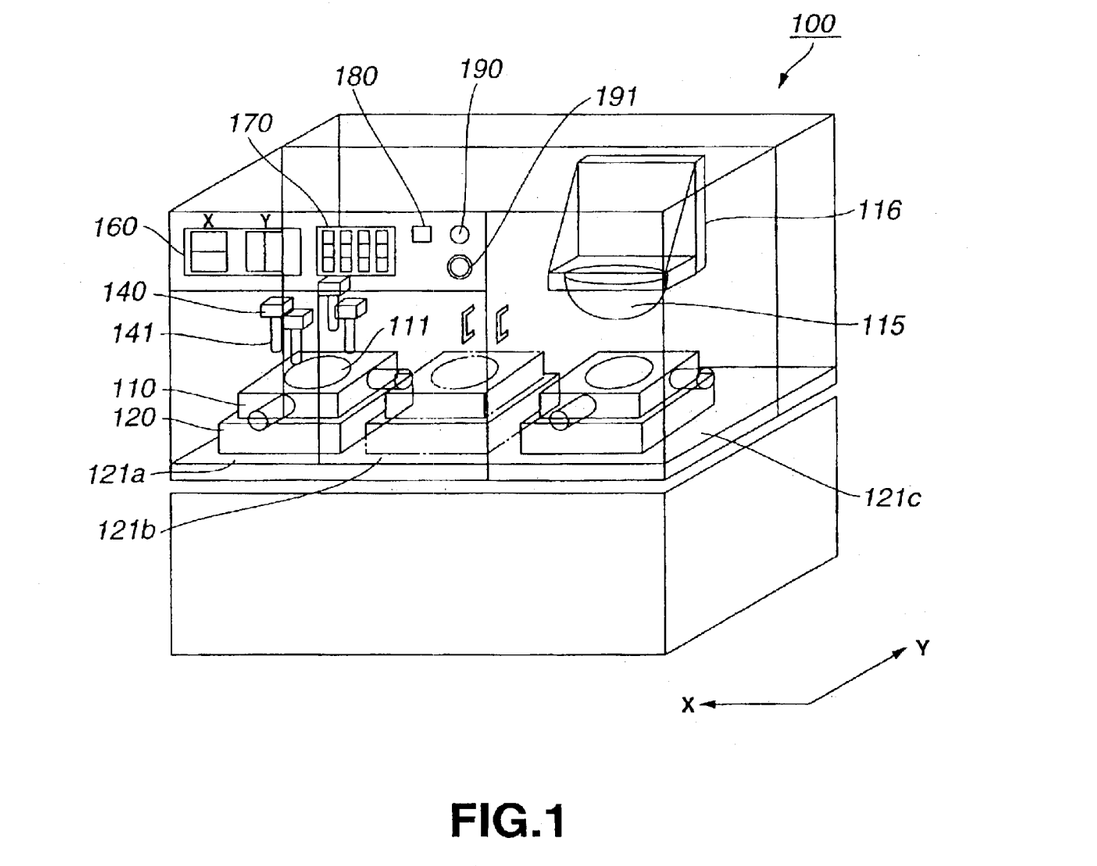
FIG. 1 is a schematic perspective view of the DVR disc manufacturing apparatus according to the present invention.

Referring now to FIG. 1, there is schematically illustrated in the form of a perspective view the DVR disc manufacturing apparatus according to the present invention. The DVR disc is a multilayer disc. The apparatus is generally indicated with a reference 100.

Figure 2A:
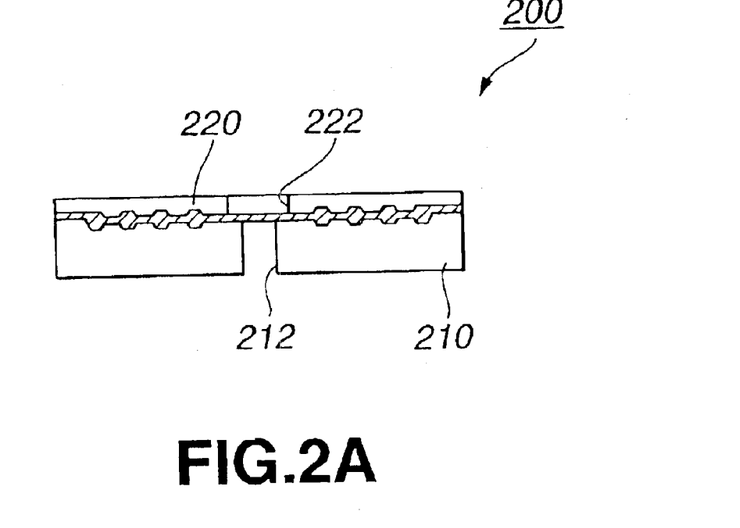
FIG. 2A is a schematic sectional view of a DVR disc produced by the DVR disc manufacturing apparatus shown in FIG. 1.

The DVR disc manufacturing apparatus 100 produces a DVR (digital video recording) disc constructed as shown in FIG. 2A. The DVR disc is generally indicated with a reference 200 in FIG. 2A.

Figure 2B:
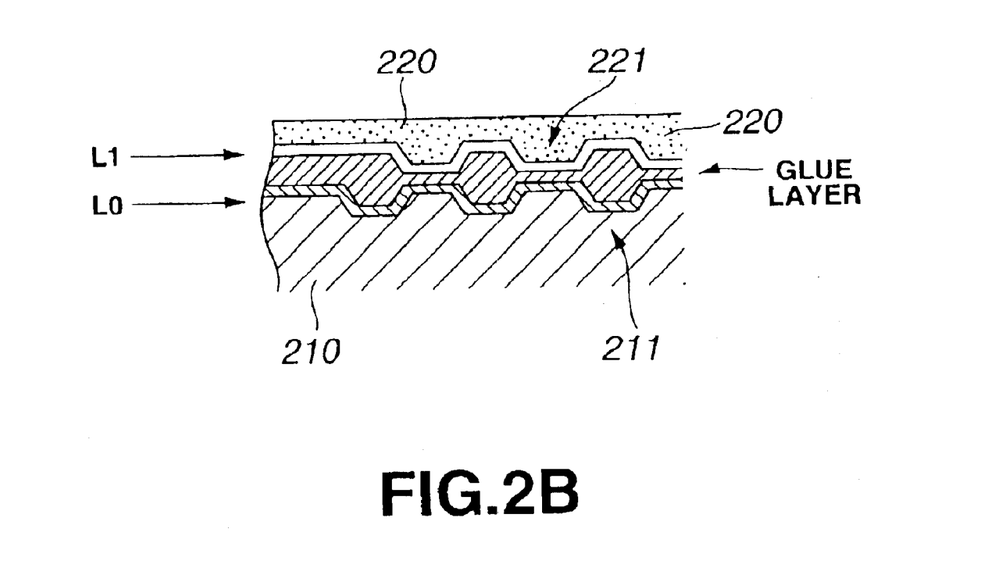
FIG. 2B is a schematic sectional view, partially enlarged in scale, of the signal recording layer shown in FIG. 2A.

FIG. 2A is a schematic sectional view of the DVR disc 200, and FIG. 2B is a schematic sectional view, partially enlarged in scale, of a signal recording layer shown in FIG. 2A. As shown in FIG. 2A, the DVR disc 200 includes two discs of which the one is a substrate 210 having a thickness of 0.3 to 1.2 mm, for example. On the upper side of the substrate 210, there is formed an emboss 221 as a signal recording layer as shown in FIG. 2B.

Further, a reflecting layer LO is formed on the emboss 211 as shown in FIG. 2B.

On the other hand, the other disc of the DVR disc 200 is a sheet-shaped disc 220 having a thickness of 44 to 114 $\mu$m, for example. As shown in FIG. 2B, the sheet-shaped disc 220 has an emboss 221 as a signal recording layer formed on the lower surface thereof, and a translucent layer L1 is provided on the lower surface of the emboss 221.

As shown in FIG. 2B, the substrate 210 and sheet-shaped disc 220 are bonded to each other with a glue layer provided between them.

As shown in FIG. 2A, the substrate 210 has a circular hole 212 formed in the center thereof, and also the sheet-shaped disc 220 has a circular hole 222 formed in the center thereof.

As will be seen, the central hole 222 in the sheet-shaped disc 220 is shaped to have a larger diameter than that of the central hole 212 in the substrate 210 for the reason that a centering pin is closely fitted in the central hole 212 to position the DVR disc 200 while the central hose 222 in the sheet-shaped disc 220 has to have a larger diameter than that of the centering pin in order to prevent the sheet-shaped disc 220 itself from being damaged due to possible contact of the inner wall of the central hole 222 with the centering pin.

Since the DVR disc 200 thus constructed is composed of the substrate 210 and sheet-shaped disc 220 bonded to each other, a bonding machine will be required to produce the DVR disc 200.

The DVR disc manufacturing apparatus 100 shown in FIG. 1 is this bonding machine.

As shown in FIG. 1, the DVR disc manufacturing apparatus 100 includes an alignment stage 110 as a positioning means. On the alignment stage 110, there is provided a circular sheet chuck 111 on which the sheet-shaped disc 220 of the DVR disc 200 shown in FIG. 2B is to be mounted.

The sheet-shaped disc 220 placed on the sheet chuck 222 is securely fixed to the sheet chuck 111 under a negative pressure (vacuum) applied through a vacuum suction hole leading to a vacuumization suction unit.

Also, under the alignment stage 110, there is provided a moving station 120 which moves the alignment stage 110 within the apparatus.

Figure 3:
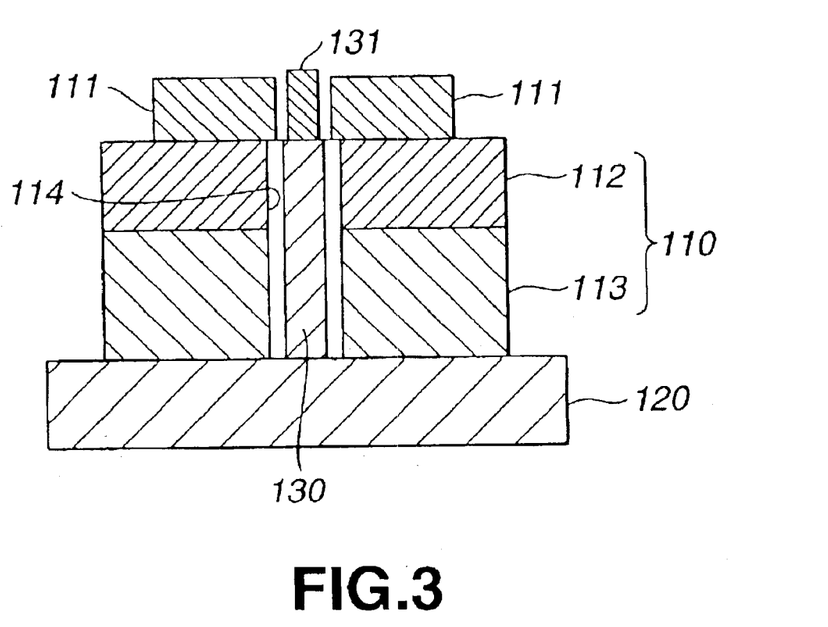
FIG. 3 is a schematic sectional view of the alignment stage, etc. shown in FIG. 1.
Figure 5:
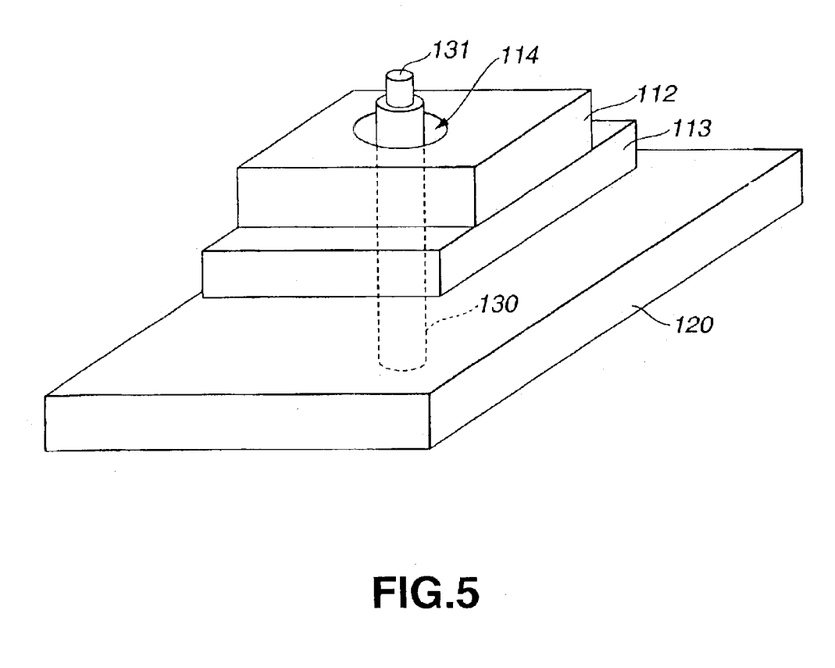
FIG. 5 is a schematic perspective view of the alignment stage, moving station, etc. shown in FIG. 3.

The geometric relation among the sheet chuck 111, alignment stage 110, moving station 120, etc. will be seen from the schematic sectional view in FIG. 3. Also, the geometric relation among the alignment stage 110, moving station 120, etc. in FIG. 3 is also shown in the schematic perspective view in FIG. 5.

As shown in FIG. 3, the alignment stage 110 includes an X-axis table 112 movable in the X-axial direction, namely, in the horizontal (right-left) direction as shown in FIG. 1. As also shown in FIG. 3, there is provided under the X-axis table 112 a Y-axis table 113 movable in the Y-axial direction, namely, in the back-and-forth direction as will be seen from FIG. 1.

Further, nearly in the center of these X- and Y-axis stages 112 and 113 is formed a through-hole 114 in which there is provided a cylindrical center post 130 fixed at the base thereof to the moving station 120. The center post 130 has provided at the top thereof a centering pin 131 whose diameter is smaller than that of the center post 130.

The centering pin 131 placed in the through-hole 114 is fixed to the moving station 120 by means of the center post 130. The X- and Y-axis tables 112 and 113 surrounding the center post 130 are movable in the X- and Y-axial directions.

As shown in FIG. 3, the sheet chuck 111 is mounted on the X-axis stage 112. Therefore, if the centering pin 131 introduced in the central hole 222 in the sheet-shaped disc 220 mounted on the sheet chuck 111 is not centered with the central hole 222, it can be centered with the central hole 222 by moving the X- and Y-axis stages 112 and 113 to change the position of the sheet-shaped disc 220 in relation to the centering pin 131.

Figure 4:
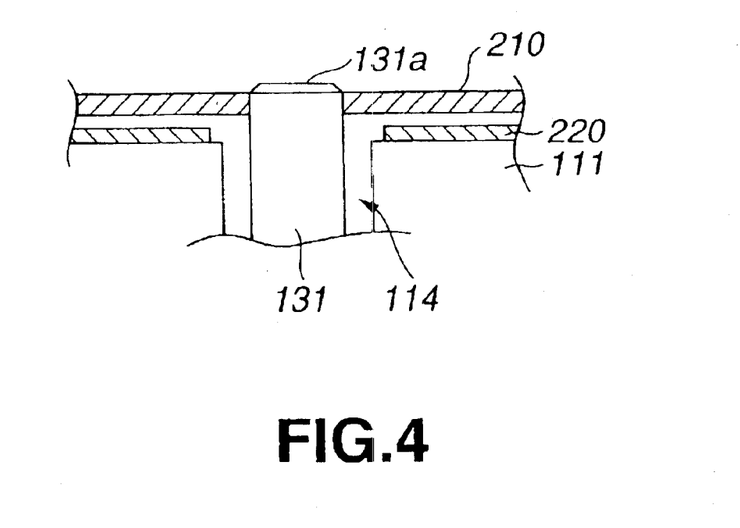
FIG. 4 is a schematic sectional view of a centering pin, etc. shown in FIG. 3.

The above relation between the centering pin 131 and sheet chuck 111 etc. is shown in the schematic sectional view in FIG. 4 showing the geometric relation among the centering pin 131, the sheet chuck 111, the sheet-shaped disc 220 and the substrate 210.

Also, FIG. 4 shows the sheet-shaped disc 220 and substrate 210 which are not yet bonded with the glue layer to each other and are thus separate from each other.

Figure 6A:
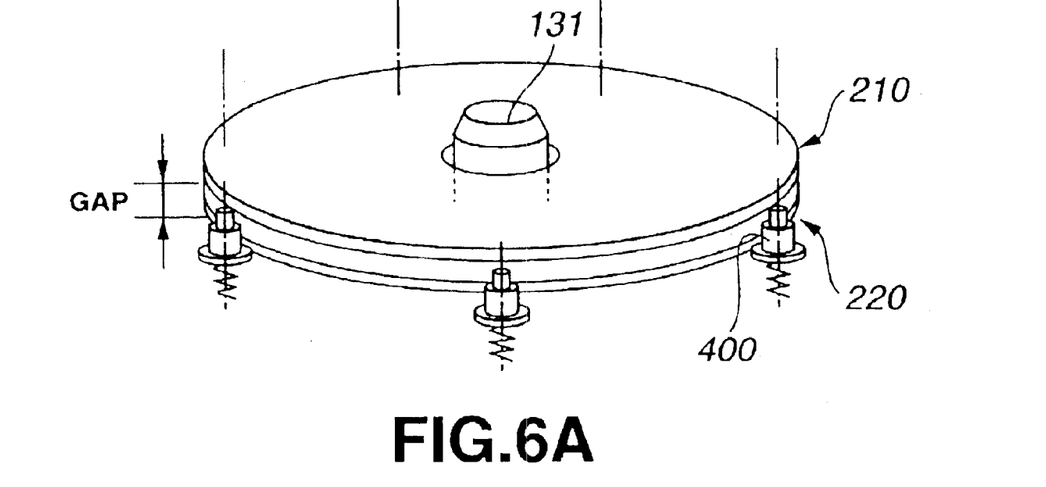
FIG. 6A is a schematic perspective view of the sheet-shaped disc, substrate and substrate reference pin.

To keep the sheet-shaped disc 220 and substrate 210 separate from each other in positioning them, there are provided substrate supporting pins 400 as shown in FIG. 6A.

As will be seen from FIG. 6A, the substrate supporting pins 400 are disposed for supporting the substrate 210 at the outer circumference to ensure a gap between the sheet-shaped disc 220 and substrate 210 so that the sheet-shaped disc 220 and substrate 210 will not be in contact with each other before they are bonded to each other.

Figure 6B:
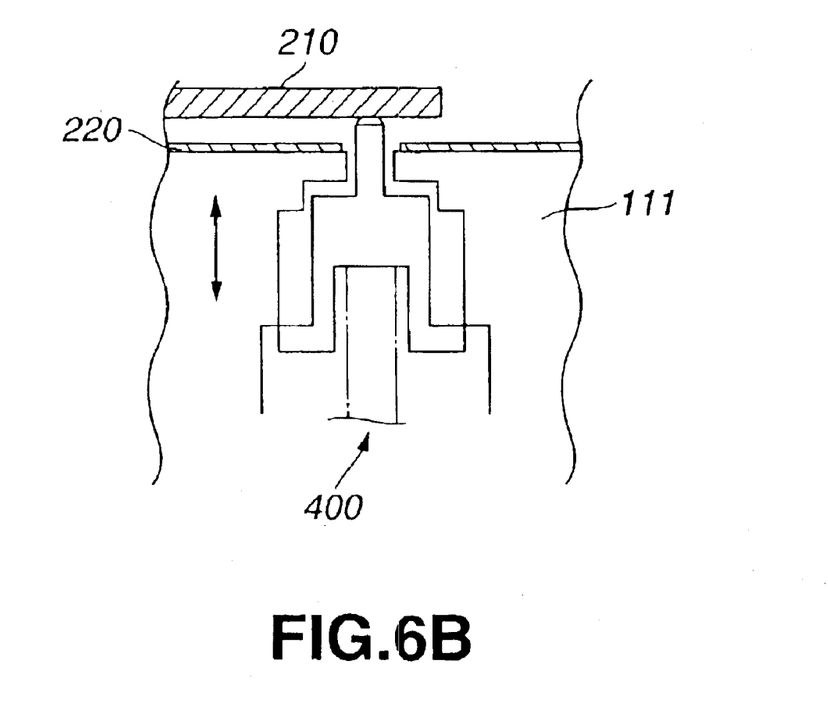
FIG. 6B is a schematic sectional view of the substrate reference pin shown in FIG. 6A.

FIG. 6B shows the construction of the substrate supporting pin 400 in detail. As shown, the substrate supporting pin 400 moves along the outer circumference of the substrate 210. When bonding the substrate 210 to the sheet-shaped disc 220, a silicon rubber pad 115 (will be described in detail later) is put in contact with the central portion of the substrate 210 in a sequence from the central portion to the outer circumference of the latter because of a spring provided in each of the substrate supporting pins.

Also, when the substrate 210 is bonded to the sheet-shaped disc 220 under the pressure of a silicon rubber pad 115 as will be described in detail later, the spring will fall in the lower direction as will be seen from FIG. 6A.

Since the centering pin 131 is shaped to have generally the same diameter as that of the central hole 212 in the substrate 210 as shown in FIG. 4, the central pin 131 can be fitted in the substrate 210.

As best shown in FIG. 4, the centering pin 131 has a taper portion 131a whose diameter is smaller than that of the centering pin 131.

Since the taper portion 131a has a diameter which is smaller towards the top end of the centering pin 131, it serves as a guide for fitting the centering pin 131 into the central hole 212 in the substrate 210. Therefore, the centering pin 131 can easily be fitted into the central hole 212 in the substrate 210.

There are available multiple centering pins 131 different in diameter from each other, any appropriate one of which is to be selected according to the diameter of the substrate 210 in pair with the sheet-shaped disc 220. The centering pins 131 have diameters different from one to another in steps of 10 μm, for example.

Above the alignment stage 110 constructed as above, there are provided four CCD cameras 140 for example as shown in FIG. 1. These CCD cameras 140 are disposed diagonally of the sheet-shaped disc 220 mounted on the sheet chuck 111, for example.

As shown in FIG. 1, there is provided below each of the CCD cameras 140 micro lenses 141 to guide the light from a halogen lamp 150 as an illuminating means vertically onto the sheet-shaped disc 220 as indicated with an arrow A in FIG. 7.

The light reflected at the surface of the sheet-shaped disc 220 is guided as a return light to the CCD camera 140 as indicated with an arrow B. Thus, the light is captured by the CCD camera 140.

An image captured by the CCD camera 140 is displayed on an image monitor 160 shown in FIG. 1.

It should be noted that near the image monitor 160, there is provided a touch-panel control/display panel 170, and a chuck vacuum indicator 180 whichs indicates the evacuation of the vacuum suction hole provided in the sheet chuck 111.

Further, there is provided a main pilot lamp 190 and an emergency stop button 191.

In the DVR disc manufacturing apparatus 100, the moving station 120 is disposed movably in the X-axial direction in FIG. 1. When the moving station 120 stays in the left portion of the apparatus 100 as shown in FIG. 1, it is at an alignment station 121a where the position of the sheets-shaped disc 220 on the sheet chuck 111 is to be adjusted. When the moving station 120 is moved to the middle portion of the apparatus 100, it will come onto a charge/discharge station 121b where the sheet-shaped disc 220 and substrate 210 are to be mounted onto, or removed from, the sheet chuck 111. When the moving station 120 is further moved to the right portion of the apparatus 100, it will come onto a bonding/pressing station 121c where the substrate 210 is to be bonded to the sheet-shaped disc 220 on the sheet chuck 111 with a glue layer placed between them.

For the above bonding process, there is provided, as shown in FIG. 1, above the bonding/pressing station 121c the silicon rubber pad 115 and a vertical pressing shaft 116, by which the sheet-shaped disc 220 and substrate 210 are pressed to each other, thereby producing a DVR disc 200.

The DVR disc manufacturing apparatus 100 constructed as above operates as will be described below:

First, the position of the CCD camera 140 in relation to the centering pin 131 is adjusted. Namely, the moving station 120 is moved to the charge/discharge station 121b shown in FIG. 1.

Figure 8:
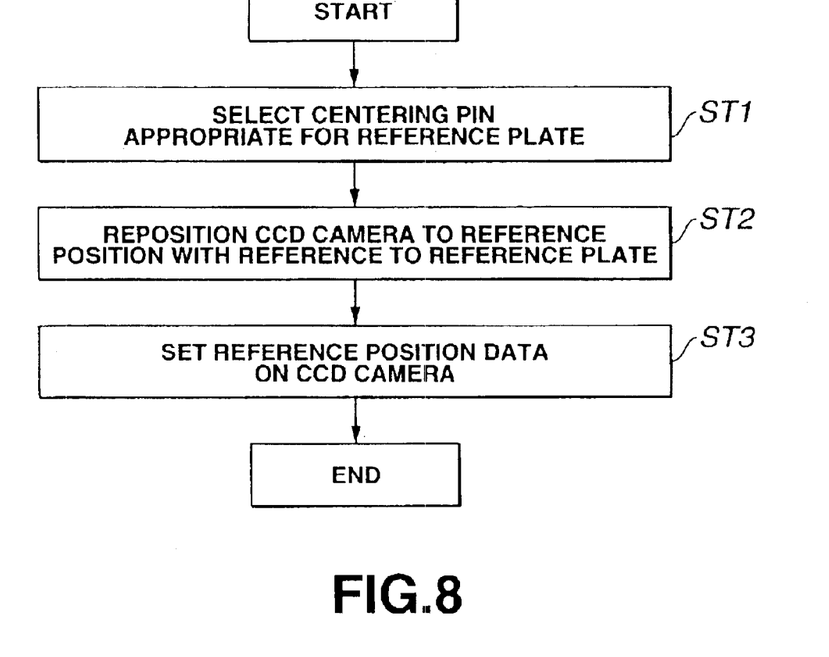
FIG. 8 shows a flow of operations made to adjust the position of the CCD camera in relation to the centering pin.

Then, in step ST1 in the flow chart in FIG. 8, a centering pin 131 of an appropriate diameter is selected which can be fitted in a central hole formed in a positioning reference plate 310 (in FIG. 9) for the CCD camera 140.

Specifically, a centering pin 131 having a diameter with which the difference between the diameter of the centering pin 131 and that of the central hole in the reference plate 310, namely, a clearance error, is 10 μm or less.

A centering pin 131 of Φ15 is selected for example. It should be noted that the reference plate 310 has an embossed signal recording area on the surface thereof.

Next, the reference plate 310 is mounted on the sheet chuck 111 shown in FIG. 3. Then, the moving station 120 is moved to the alignment station 121a in FIG. 1.

Figure 7:
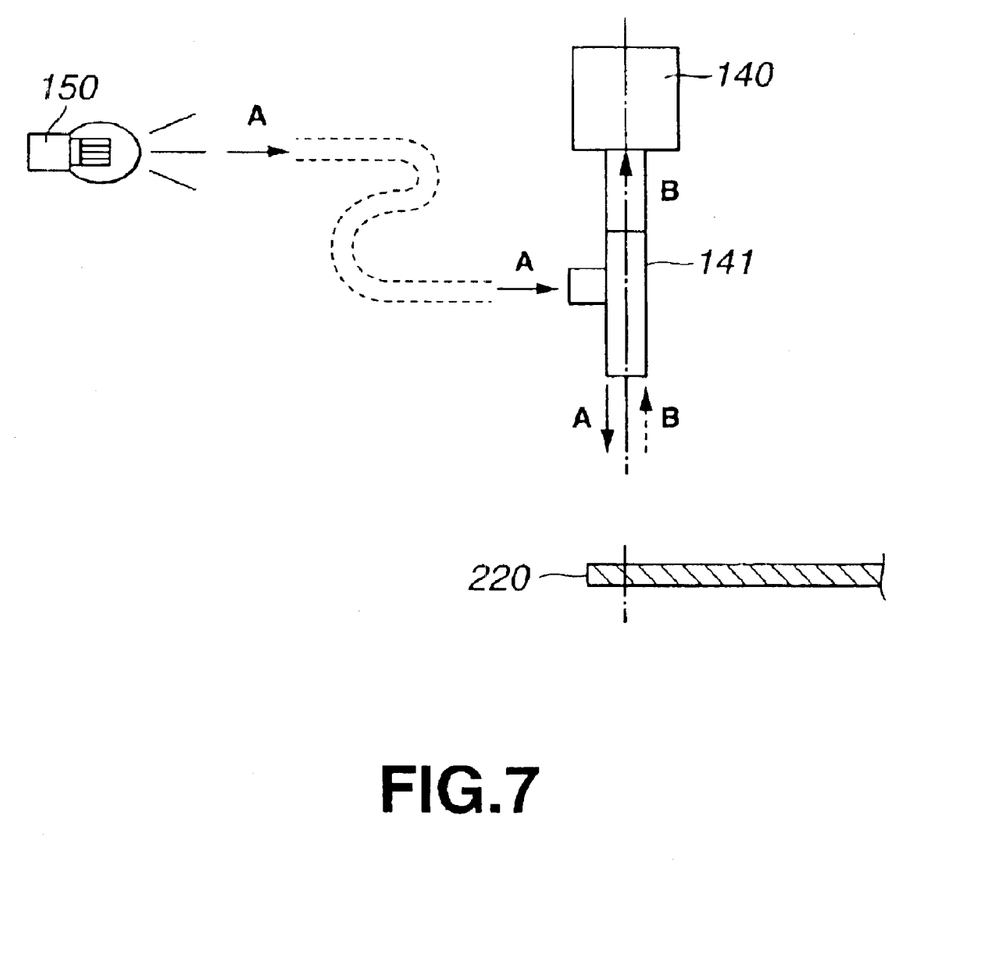
FIG. 7 schematically illustrates the optical path of the light from the halogen lamp.
Figure 9:
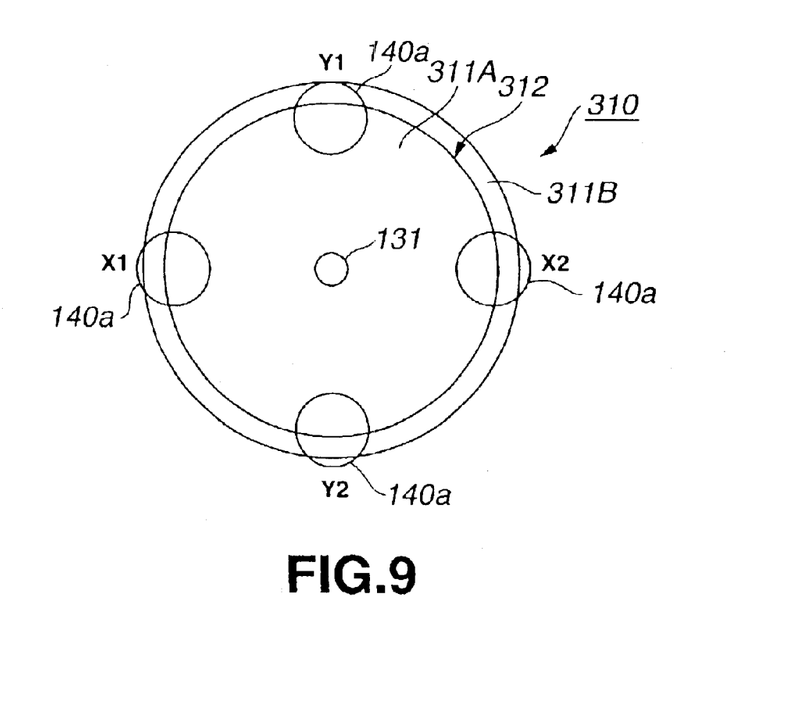
FIG. 9 is schematic plan view of the reference substrate and of a CCD camera.

With the moving station 120 at the alignment station 121a, the light from the halogen lamp 150 shown in FIG. 7 is projected onto the surface of the reference plate 310 and a return light from the reference plate surface is captured by the CCD camera 140, which is shown in FIG. 9. As shown in FIG. 9, the light is projected onto the boundary between an embossed signal recording area 311A on the reference plate 310 and a non-signal recording area 311B around the area 311A, and an observation area 140a is captured by the CCD camera 140.

The CCD cameras 140 and micro lenses 141 are placed so that the observation areas 140a are regularly positioned at intervals of 90 degrees, as shown in FIG. 9.

Figure 10A:
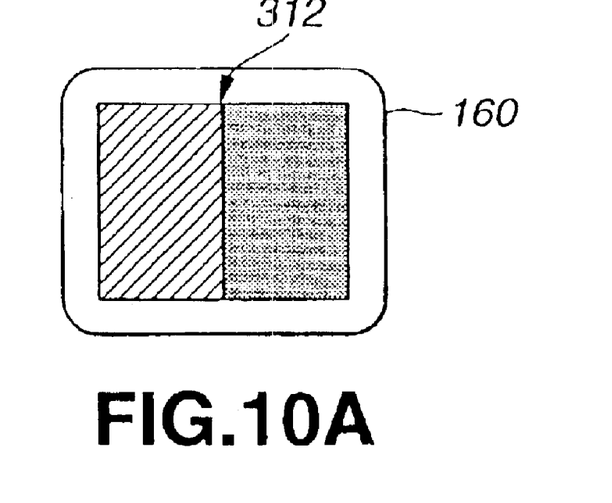
FIG. 10A shows a display, on the image monitor, of a CCD camera-captured image of a boundary.

A return light from the reference plate 310 is captured by the four CCD cameras 140. FIG. 10A shows a display, on an image monitor 160, of the result of return light capture. As shown in FIG. 10A, the display on the image monitor 160 consists of a bright left half and a dark right half.

Figure 10B:
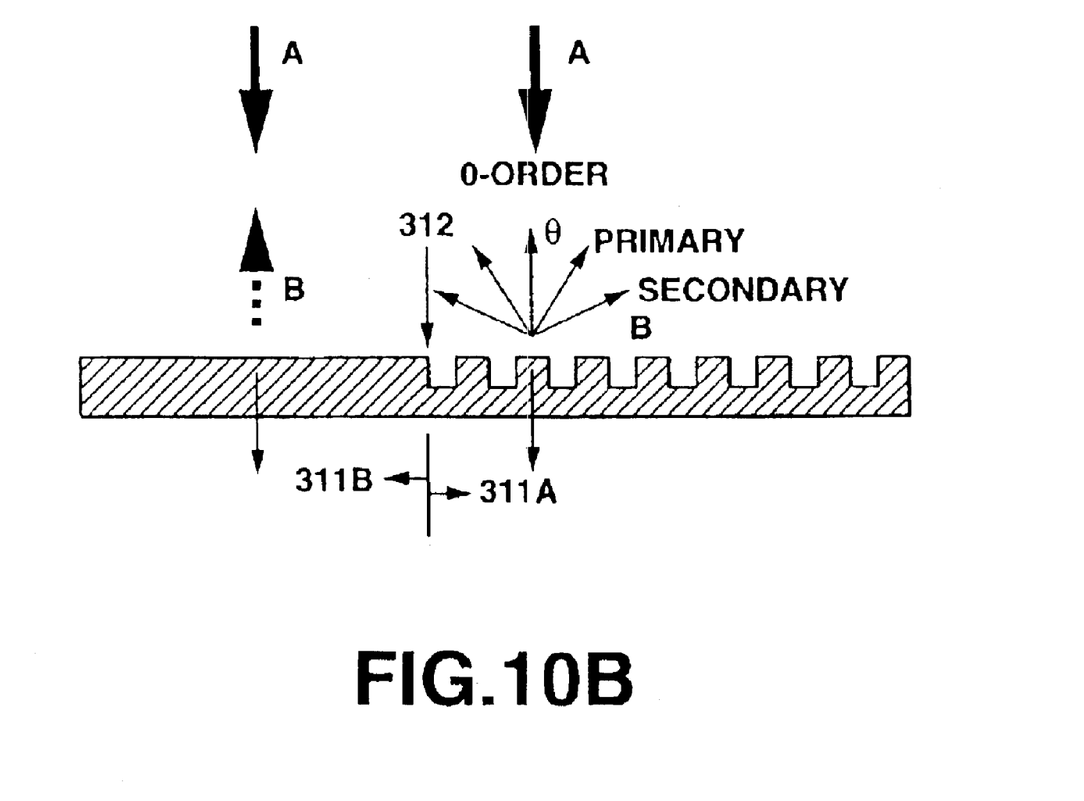
FIG. 10B schematically illustrates the light reflection and return light.

Because the embossed signal recording area 311A illuminated by the light from the halogen lamp 150 provides a primary or secondary diffraction of the incident light, as shown in FIG. 10B, so that the intensity of the return light is reduced, this results in a dark right half of the display on the image monitor 160 as shown in FIG. 10A.

On the contrary, the non-signal recording area 311B, not embossed, does not diffract the incident light from the halogen lamp 150 as the embossed signal recording area 311A, so that the incident light is reflected directly, and captured and not reduced in intensity, by the CCD camera 140. Thus, the return light from the non-signal recording area 311B results in a bright left half of the display on the image monitor 160 as shown in FIG. 10A.

The above difference in darkness (or brightness) makes clear a boundary 312 between the signal recording area 311A and non-signal recording area 311B, and so the boundary 312 can be definitely recognized on the image monitor 160.

As shown in FIG. 9, the boundary 312 is captured in the four observation areas 140a and its images are stored as positional information in a storage unit.

Thereafter, the reference plate 310 is turned 30 degrees., the boundary 312 is captured again in the four observation areas 140a, and its images are stored again in the storage unit.

By repeating the above procedure several times, it is possible to acquire eccentricity information as to the reference plate 310 itself. The four CCD cameras 140 are positioned based on the eccentricity information to be equidistant from the centering pin 131. The above procedure is taken in step ST2 in FIG. 8. When the four CCD cameras 140 are equidistant from the centering pin 131, they are in their respective reference positions.

Then in step ST3 in FIG. 8, the reference positions of the CCD cameras 140 are stored as data. More specifically, data in an internal memory in the image monitor 160 are updated and data processing-side PLC (programmable logic controller) parameters are set.

The above procedure is the adjustment of the positions of the CCD camera 140 with the centering pin 131. This procedure is taken only in the first step of the manufacturing process in which a substrate 210 of the same type is used, and may not be readjusted unless a substrate of any other type is to be used.

After the data on the reference positions of the CCD cameras 140 are acquired, the reference plate 310 is discharged from the charge/discharge station 121b in FIG. 1.

Thereafter, the sheet-shaped disc 220 to actually be bonded to the substrate 210 is mounted on the sheet chuck 111.

Figure 11:
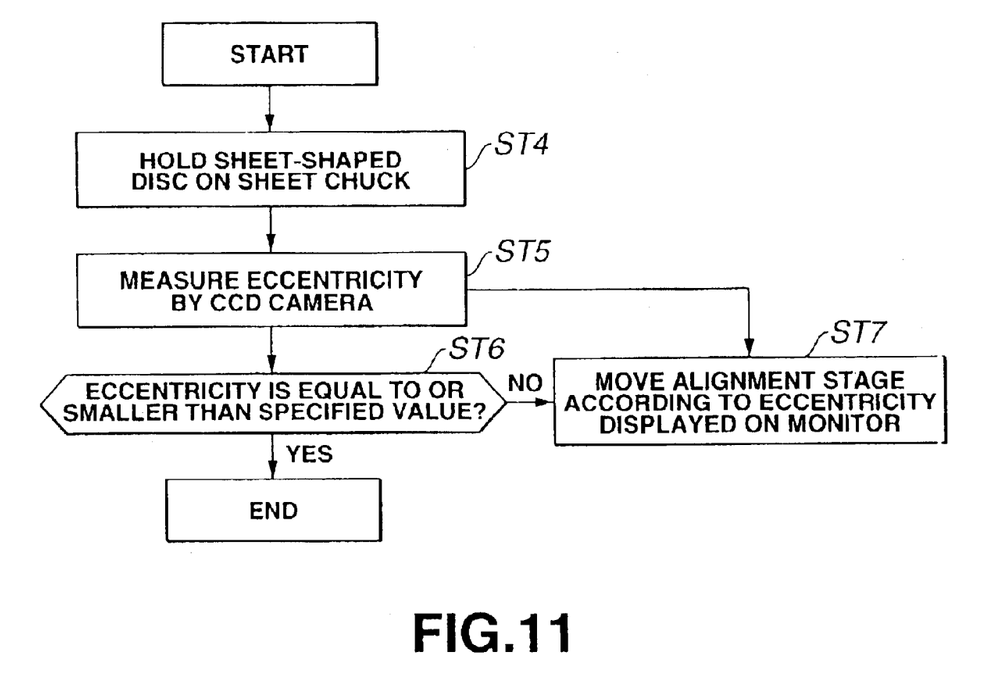
FIG. 11 shows a flow of operations made for positional alignment of the sheet-shaped disc.
Figure 12:
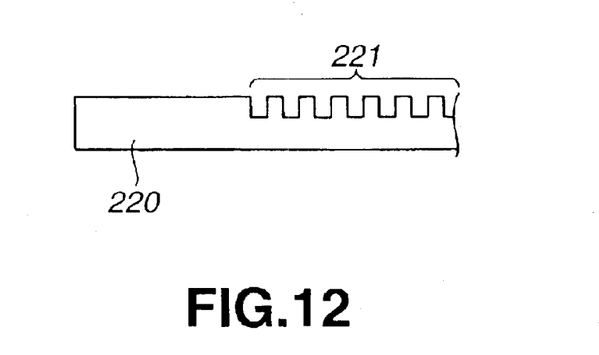
FIG. 12 explains the sheet-shaped disc positioned on the sheet chuck.

Namely, in step ST4 in FIG. 11, the sheet-shaped disc 220 is placed on the sheet chuck 111 shown in FIG. 3, and more particularly, on the side of the sheet-shaped disc 220 on which the emboss 221 as a signal recording layer is formed being upside as shown in FIG. 12.

Since the central hole 212 in the sheet-shaped disc 220 is shaped to have a sufficiently larger diameter than that in the centering pin 131, the sheet-shaped disc 220 will not touch the centering pin 131 and so it will not be damaged.

Upon mounting the sheet-shaped disc 220 in the sheet chuck 111, the vacuumization suction unit (not shown) is put into operation to start vaccumizing the vacuum suction hole provided in the sheet chuck 111. The sheet-shaped disc 220 will be fixed to the sheet chuck 111 with a high accuracy.

At this time, the sheet-shaped disc 220 being very thin as mentioned above is not mechanically chuckedso that the disc 220 itself will not be damaged. The vacuumization is indicated on the chuck vacuum indicator 180 shown in FIG. 1, and thus an optimum vacuum can always be maintained.

When the alignment stage 110 having the sheet-shaped disc 220 mounted thereon is on the alignment station 121a, it is positioned under the CCD camera 140.

Figure 13:
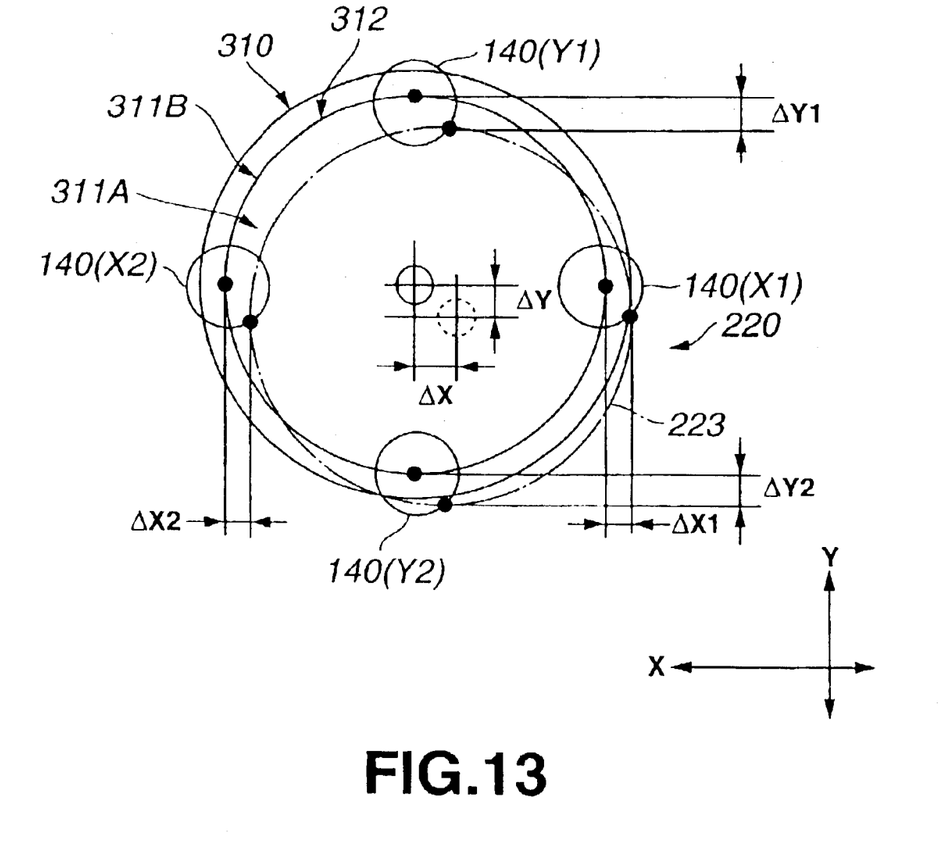
FIG. 13 schematically illustrates the relation between the CCD camera and a sheet-shaped disc.

FIG. 13 shows the relation between the CCD camera 140 and sheet-shaped disc 220 in the above condition.

The four CCD cameras 140 are disposed so that the observation areas 140a are regularly positioned at intervals of 90 degrees. as shown in FIG. 13. Specifically, of the four CCD cameras 140, two Y1 and Y2 are disposed along the X-axis, while the other two X1 and X2 are disposed along the X-axis.

In FIG. 13, the solid line indicates a reference position stored as data which can be determined from the aforementioned reference plate 310, that is, the boundary 312 etc. on the reference plate 310.

The dashed line indicates a boundary 223 between the embossed signal recording area and non-signal recording area on the sheet-shaped disc 220.

Similarly to the reference plate 310, the sheet-shaped disc 220 is also illuminated at the boundary 223 thereof with the light from the halogen lamp 150 in the vertical direction as shown in FIG. 7.

Conventionally, the light is projected obliquely. So, any difference in intensity between the reflected light from the non-signal recording area and that from the signal recording area, as shown in FIG. 10B, cannot be captured as a definite contrast by the CCD camera.

In this embodiment in which the light from the halogen lamp 150 is projected vertically, however, since the return light from the signal recording area is greatly reduced in intensity, a definite contrast can be captured by the CCD camera.

More particularly, when the light projected from the halogen lamp 150 is incident upon the boundary 223 at an angle of 0 deg., the difference in intensity (intensity of N-order diffracted light) between the reflected light from the signal recording area and that from the non-signal recording area is given by the following formula (1):

$$Pn = \sin\theta n = N \cdot \lambda / d \qquad (1)$$

where N is the order of diffraction, θ is the angle of diffraction, λ is the wavelength and d is the lattice period.

In this embodiment, the track pitch of the sheet-shaped disc 220 is as small as 0.2 to 0.8 μm. Also, since the halogen lamp 150 is used to illuminate the sheet-shaped disc 220, the term λ/d in the formula (1) is approximately 1.0. Therefore, the primary angle of diffraction θ1 in FIG. 9 is nearly a right angle, so that the return light from the signal recording area will be reduced greatly.

Thus, the difference in intensity between the reflected light from the signal recording area and that from the non-signal recording area will be very large, resulting in such a definite contrast that the boundary 223 can distinctly be captured by the CCD camera 140.

By capturing the boundary 223 by the four CCD cameras 140, it is possible to recognize that the sheet-shaped disc 220 is disposed as indicated with the dashed line shown in FIG. 13.

Comparison of the above position of the sheet-shaped disc 220 with the reference position (indicated with the solid line) of the reference plate 310 will make it clear that there is a large eccentricity between the positions shown in FIG. 13. The eccentricity is measured in step ST5 in FIG. 11.

The above eccentricity is computed by following the procedure below:

The CCD camera 140 (Y1) in FIG. 13 is used to detect a portion, encircled, of the boundary 223 of the sheet-shaped disc 220.

Then, the difference between the result of this detection and the corresponding boundary 312 on the Y-axis in data having previously been acquired as a reference position (see FIG. 9) is taken as ΔY1 shown in FIG. 13.

Also, the CCD camera 140 (Y2) is used to detect a portion, encircled, of the boundary 312 of the reference plate 310. Then, the difference between the result of this detection and the corresponding boundary 312 on the Y-axis in data having previously been acquired as a reference position is taken as ΔY2.

Further, the CCD camera 140 (X1) is used to detect a portion, encircled, of the boundary 223 of the sheet-shaped disc 220. Then, the difference between the result of this detection and the corresponding boundary 223 on the X-axis in data having previously been acquired as a reference position is taken as ΔX1. Also, the CCD camera 140 (X2) is used to detect a portion, encircled, of the boundary 312 of the reference plate 310. Then, the difference between the result of this detection and the corresponding boundary 312 on the X-axis in data having previously been acquired as a reference position is taken as ΔX2.

From the data acquired as above, it is possible to compute an X-axial eccentricity ΔX in FIG. 13 as follows:

$$\Delta X = (\Delta X1 + \Delta X2)/2$$

Also, a Y-axial eccentricity ΔY can be computed as follows:

$$\Delta Y = (\Delta Y1 + \Delta Y2)/2$$

Thus, the total eccentricity will be:

$$(1/2) \cdot \sqrt{\{(\Delta X1 + \Delta X2)^2 + (\Delta Y1 + \Delta Y2)^2\}}$$

As above, the eccentricity can be determined by comparing, in position, the center (in the dash-line circle in FIG. 13) of the embossed signal recording area of the sheet-shaped disc 220 and that (in the solid-line circle in FIG. 13) of the reference plate 310.

As will be evident from the above formula, the position of the position can be computed without being influenced by any variation in diameter of the emboss 221 as a signal recording layer due to an expansion or shrinkage of the sheet material, etc. of the sheet-shaped disc 220.

By comparing an eccentricity with a specified value falling within a permissible range based on information on a reference position, the existence and amount of an eccentricity are determined in step ST6 in FIG. 11.

When the eccentricity is larger than the specified value, it is displayed on the image monitor 160 shown in FIG. 1, and the X- and Y-axial stages 112 and 113 of the alignment stage 110 are moved in step ST7.

More particularly, the X-axial stage 112 in FIG. 3 is moved by the value $\Delta X$ (in FIG. 13) while the Y-axial stage 113 is moved by the value $\Delta Y$ (in FIG. 13).

At this time, since the centering pin 131 will not move even when the X- and Y-axial stages 112 and 113 are moved as above, the position of the boundary 223 of the sheet-shaped disc 220 in relation to the centering pin 131 can be changed similarly to the boundary 312 of the reference plate 310.

Since the above adjustment can be done easily and in a non-contact manner, the sheet-shaped disc 220 will not be damaged. Also, since the sheet-shaped disc 220 does not have to be rotated or otherwise moved for determination of the eccentricity, which is different from the prior art, the DVR disc manufacturing apparatus may not be of any large scale and the tact time will not be increased.

After making the adjustment by moving the X- and Y-axial stages 112 and 113, the eccentricity is detected again in step ST5, and when the detected eccentricity is determined in step ST6 in FIG. 11 to be larger than the specified value, the X- and Y-axial stages 112 and 113 are moved again in step ST7.

After the above steps, when it is determined in step ST6 that the eccentricity is smaller than the specified value, the alignment of the sheet-shaped disc 220 with the substrate 210 is complete.

When the alignment procedure as in FIG. 11 is complete at the alignment station 121a in FIG. 1, the alignment stage 110 having the sheet-shaped disc 220 mounted thereon is supplied with a substrate (210) to be bonded to the sheet-shaped disc 220 and moved to the bonding/pressing station 121c shown in FIG. 1.

Figure 14:
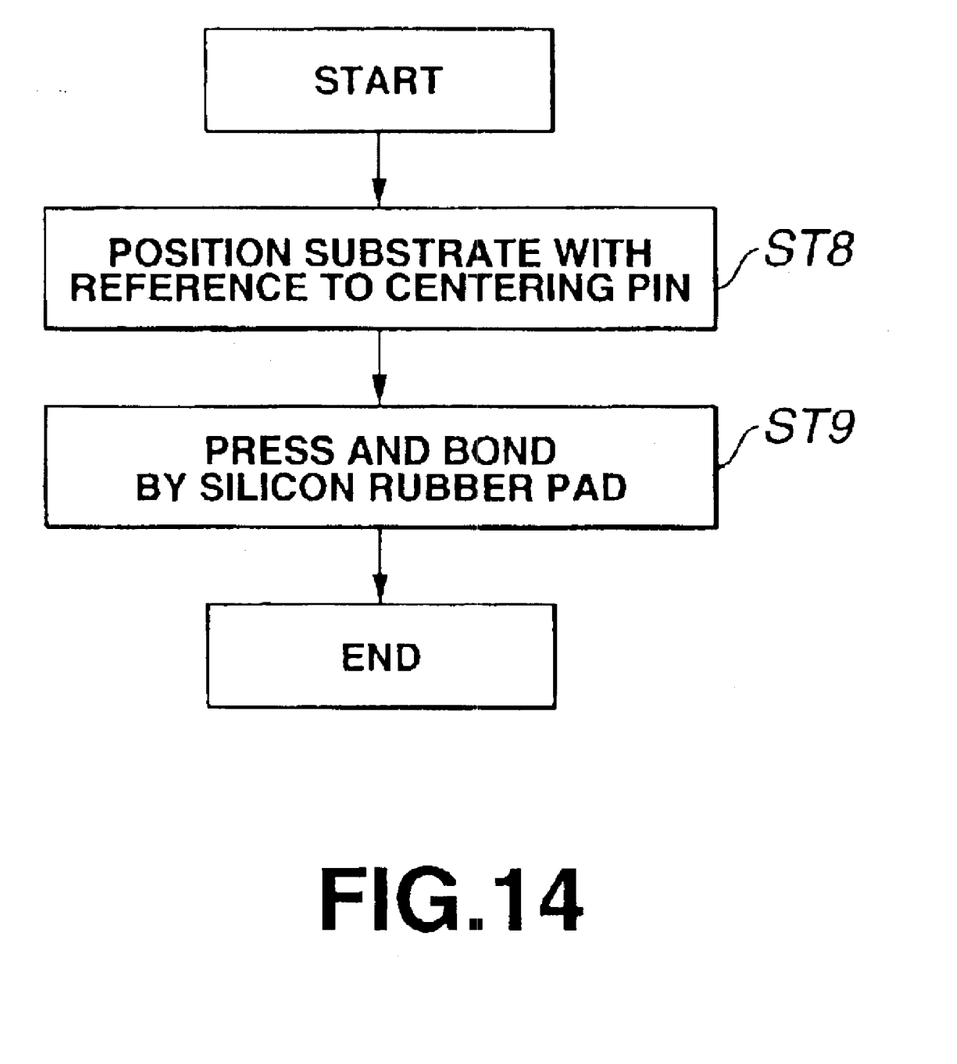
FIG. 14 shows a flow of operations made in bonding a substrate and a sheet-shaped disc to each other.

At the bonding/pressing station 121c, the central hole 212 formed in the substrate 210 is positioned with reference to the centering pin 131 in FIG. 4 in step STB in FIG. 14. At this time, the substrate 210 is held 1 mm above the sheet-shaped disc 220.

Also, a bonding glue is laid on the top of the sheet-shaped disc 220 as in FIG. 4 or on the bottom of the substrate 210 as in FIG. 4.

Thereafter, the patting silicon rubber pad 115 being convex in the central portion thereof is used to press and bond the substrate 210 and the sheet-shaped disc 220 with a bonding glue to each other under a given pressure and for a given resting time as shown in FIG. 1 (in step ST9 in FIG. 14), to thereby produce a multilayer DVR disc 200.

Having undergone predetermined processes after that, the DVR disc 200 is finished as shown in FIG. 2.

As above, in this embodiment, the "fitting clearance" resulting from the introduction of the centering pin 131 is used only for positioning the substrate 210, the eccentricity of the sheet-shaped disc 220 is detected, and the position of the disc 220 is adjusted, without any contact of the centering pin 131 with the disc 220. Thus, the multilayer disc can be produced with less overall internal eccentricity than ever.

Also, since an eccentricity of the embossed signal recording area of the sheet-shaped disc 220 can be directly computed and corrected, no pressure or weight will be applied to the sheet-shaped disc 220 which will thus not be damaged.

Also, since multiple centering pins 131 of different sizes are available, any appropriate one can be selected for positioning, so that error in positioning the substrate 210 can be reduced and thus the finished multilayer DVR disc 200 will have the overall internal eccentricity minimized, if any.

Further, since the center of the sheet-shaped disc 220 (enclosed in a dashed-line circle in FIG. 13) is computed with reference to the boundary 223 being the outermost circumference of the signal recording area, the overall internal eccentricity rate of the finished DVR disc 200 can be minimized, even if the DVR disc manufacturing apparatus 100 incurs a positioning error.

Further, since the multiple CCD cameras 140 fixed in place can be used to instantly compute a deviation from the reference position, it is possible to compute an eccentricity of the sheet-shaped disc 220 in an extremely shorter time than required by the conventional method of detecting such an eccentricity of the sheet-shaped disc 220 being rotated.

Moreover, since such an eccentricity can be corrected at the alignment stage 110 while a new eccentricity is being computed, the eccentricity computation made in this embodiment according to the present invention, when in combination with a feedback loop, allows the detection of an eccentricity in a shorter time and with a higher accuracy.

If the internal eccentricity of the DVR disc 200 produced by the DVR disc manufacturing apparatus 100 according to the present invention is known, it can be taken as a corrective value into the eccentricity correction loop to further reduce the eccentricity possibly taking place in the course of production in the DVR disc manufacturing apparatus.

Note that, according to the embodiment, the boundary 223 being the outermost circumference of the signal recording area on the sheet-shaped disc 220 is captured by the CCD cameras 140. However, the present invention is not so limited, but a boundary being the innermost circumference of the signal recording area may be so captured.

Also, the outermost circumferential area may be the lead-in signal recording area while the outermost circumferential area may be the lead-out signal recording area. That is, any boundary between a portion where an embossed signal recording area is provided and one where such area is not provided will do as the "boundary" referred to herein.

Note that the present invention is not limited to any of the aforementioned embodiments and variants but the embodiments and variants may be combined together to define the present invention.

INDUSTRIAL APPLICABILITY

As described in the foregoing, the present invention can provide a multilayer disc manufacturing apparatus and method capable of computing the rotational eccentricity of a disc with no contact with the disc and a high accuracy and producing the disc with lower costs and without having to rotate the disc or perform any other complicated operations.

What is claimed is:

1. A method for manufacturing a multilayer disc by bonding one disc to another disc, the method including steps of:

fixing, by a disc fixing means, the one disc in place;

supporting, by a supporting means, said another disc;

projecting, by a light projecting means, a light onto a boundary between an embossed signal recording area and non-signal recording area on the one disc fixed in place;

capturing, by a return light capturing means, a return light from the boundary illuminated with the light projected from the light projecting means, the return light being captured from the boundary at four observation areas, the four observation areas being circumferentially disposed around the boundary at intervals of 90 degrees;

determining the center of the signal recording area on the one disc based on a information as to the signal recording area, acquired in the return light capturing step;

varying, by a relative position varying means, the center of the signal recording area on said another disc in relation to the disc fixing means in order to align the center of the signal recording area of the one disc, determined in the area center determining step, with the centering means; and bonding the one disc and other disc to each other.

2. The method according to claim 1, wherein:

the return light capturing means include multiple cameras; and the rotational eccentricity is computed based on the information captured by the multiple cameras in the area center determining step.

3. The method according to claim 1, wherein:

the light projecting means projects light generally vertically onto the surface of the one disc; and the return light capturing means captures a return light generally vertically reflected from the surface of the one disc.

4. The method according to claim 1, wherein:

the one disc is a sheet-shaped disc while said another disc is a substrate-like disc; and the sheet-shaped disc is formed thinner than the substrate-like disc.

5. The method according to claim 1, wherein:

the supporting means include supporting pins for supporting said another disc.

6. The method according to claim 5, wherein:

the supporting pins each having a spring, the spring being urged in a lower direction when said another disc is bonded to the one disc.

7. The method according to claim 5, wherein:

the supporting pins are disposed along the outer circumference of said another disc.

8. The method according to claim 5, wherein:

prior to bonding the one disc to said another disc, the supporting pins isolating the one disc from said another disc.

9. The method according to claim 1, wherein:

the track pitch of the one disc is as small as 0.2 to 0.8 μm.

10. The method according to claim 1, wherein:

said another disc has a thickness of 44 to 114 μm.

11. An apparatus for manufacturing a multilayer disc by bonding one disc to another disc, the apparatus comprising:

disc fixing means for fixing the one disc;

supporting means for supporting said another disc;

light projecting means for projecting a light onto a boundary between an embossed signal recording area and non-signal recording area on the one disc fixed in place;

return light capturing means for capturing a return light from the boundary illuminated with the light projected from the light projecting means, the return light being captured from the boundary at four observation areas, the four observation areas being circumferentially disposed around the boundary at intervals of 90 degrees;

centering means for positioning the center of a signal recording area on said another disc; and relative position varying means for varying the position of the centering means in relation to the disc fixing means.

12. The apparatus according to claim 11, wherein:

the disc fixing means is a suction unit to fix the one disc by suction;

the centering means is a centering pin; and the relative position varying means is a biaxial stage laid in a plane parallel with the one disc.

13. The apparatus according to claim 12, wherein the centering pin has a taper portion whose diameter is smaller towards the free end thereof.

14. The apparatus according to claim 12, wherein multiple centering pins each are of different diameters any one of the multiple centering pins being selectable.

15. The apparatus according to claim 14, wherein said one of the multiple centering pins is selected according to the diameter of said another disc in pair with the one disc.

16. The apparatus according to claim 11, wherein the light projecting means projects light generally vertically onto the surface of the one disc and the return light capturing means captures a return light generally vertically reflected from the surface of the one disc.

17. The apparatus according to claim 11, wherein:

the one disc is a sheet-shaped disc while said another disc is a substrate disc;

the sheet-shaped disc is formed thinner than the substrate-disc; and the central hole of the sheet-shaped disc is bigger than the central hole of the substrate disc.

18. The apparatus according to claim 11, wherein:

the supporting means include supporting pins for supporting said another disc.

19. The apparatus according to claim 18, wherein:

the supporting pins each having a spring, the spring being urged in a lower direction when said another disc is bonded to the one disc.

20. The apparatus according to claim 18, wherein:

the supporting pins are disposed along the outer circumference of said another disc.

21. The apparatus according to claim 18, wherein:

prior to bonding the one disc to said another disc, the supporting pins isolate the one disc from said another disc.

22. The apparatus according to claim 11, wherein:

the track pitch of the one disc is as small as 0.2 to 0.8 μm.

23. The apparatus according to claim 11, wherein:

said another disc has a thickness of 44 to 114 μm.

* * * * *